United States Patent
Guleryuz et al.

(10) Patent No.: US 12,254,406 B2
(45) Date of Patent: Mar. 18, 2025

(54) OBJECT OBSERVATION PREDICTION IN IMAGES USING ENCODER-DECODER MODELS

(71) Applicant: Google LLC, Mountain View, CA (US)

(72) Inventors: Onur G. Guleryuz, San Francisco, CA (US); Sean Ryan Francesco Fanello, San Francisco, CA (US)

(73) Assignee: Google LLC, Mountain View, CA (US)

( * ) Notice: Subject to any disclaimer, the term of this patent is extended or adjusted under 35 U.S.C. 154(b) by 241 days.

(21) Appl. No.: 17/304,505

(22) Filed: Jun. 22, 2021

(65) Prior Publication Data

US 2022/0405569 A1    Dec. 22, 2022

(51) Int. Cl.
| | | |
|---|---|---|
| G06F 3/01 | (2006.01) | |
| G06N 3/045 | (2023.01) | |
| G06N 3/08 | (2023.01) | |
| G06V 40/19 | (2022.01) | |

(52) U.S. Cl.
CPC ............ *G06N 3/08* (2013.01); *G06F 3/013* (2013.01); *G06N 3/045* (2023.01); *G06V 40/19* (2022.01)

(58) Field of Classification Search
CPC .......... G06N 3/08; G06N 3/045; G06F 3/013; G06V 40/19; G06V 10/774; G06V 10/94; G06V 20/20; G06V 10/82
See application file for complete search history.

(56) References Cited

U.S. PATENT DOCUMENTS

| | | | |
|---|---|---|---|
| 2019/0273510 A1* | 9/2019 | Elkind | ................ H03M 7/4093 |
| 2019/0354806 A1* | 11/2019 | Chhabra | ................ G06N 3/044 |
| 2021/0011550 A1 | 1/2021 | Barkman et al. | |
| 2021/0034836 A1 | 2/2021 | Haimovitch-Yogev et al. | |

FOREIGN PATENT DOCUMENTS

| | | |
|---|---|---|
| CN | 109919059 B | 1/2021 |
| WO | 2021034961 A1 | 2/2021 |

OTHER PUBLICATIONS

EyeNet: A Multi-Task Network for Off-Axis Eye Gaze Estimation and User Understanding, Aug. 24, 2019.*
International Search Report and Written Opinion for PCT Application No. PCT/US2022/073092, mailed on Oct. 10, 2022, 13 pages.
Cheng, et al., "Puregaze: Purifying Gaze Feature for Generalizable Gaze Estimation", arXiv:2103.13173v1, Mar. 24, 2021, 12 pages.

(Continued)

*Primary Examiner* — Marcos L Torres
(74) *Attorney, Agent, or Firm* — Brake Hughes Bellermann LLP

(57) ABSTRACT

A method including, in a training phase, training a gaze prediction model including a first model and a second model, the first model and the second model being configured in conjunction to predict segmentation data based on training data, training a third model together with the first model and the second model, the third model being configured to predict a training characteristic using an output of the first model based on the training data, and in an operational phase, receiving operational data and predicting an operational characteristic using the trained first model and the trained third model.

21 Claims, 7 Drawing Sheets

(56) References Cited

OTHER PUBLICATIONS

Kothari, et al., "Ellseg: an Ellipse Segmentation Framework for Robust Gaze Tracking", IEEE Transactions on Visualization and Computer Graphics, vol. 27, No. 5, May 2021, pp. 2757-2767.

Park, et al., "Few-Shot Adaptive Gaze Estimation", 2019 IEEE/CVF International Conference on Computer Vision (ICCV), 2019, pp. 9367-9376.

Wang, et al., "Realtime and Accurate 3D Eye Gaze Capture With DCNN-Based Iris and Pupil Segmentation", IEEE Transactions on Visualization and Computer Graphics, vol. 27, No. 1, Jan. 2021, pp. 190-203.

Wu, et al., "Eyenet: A Multi-Task Network for Off-Axis Eye Gaze Estimation and User Understanding", arXiv:1908.09060v1, Aug. 24, 2019, 17 pages.

Fuhl, et al., "PupilNet v2.0: Convolutional Neural Networks for CPU based real time Robust Pupil Detection", http://arxiv.org/abs/1711.00112, Oct. 30, 2017, 30 pages.

Kim, et al., "NVGaze: An Anatomically-Informed Dataset for Low-Latency, Near-Eye Gaze Estimation", CHI 2019, May 4-9, 2019, 12 pages.

Lemley, et al., "Efficient CNN Implementation for Eye-Gaze Estimation on Low-Power/Low-Quality Consumer Imaging Systems", arXiv:1806.10890v1, Jun. 28, 2018, 9 pages.

Park, et al., "Deep Pictorial Gaze Estimation", arXiv:1807.10002, Jul. 26, 2018, 20 pages.

Ronneberger, et al., "U-Net: Convolutional Networks for Biomedical Image Segmentation", MICCAI 2015, May 18, 2015, pp. 234-241.

Tonsen, et al., "InvisibleEye: Mobile Eye Tracking Using Multiple Low-Resolution Cameras and Learning-Based Gaze Estimation", Proceedings of the ACM on Interactive, Mobile, Wearable and Ubiquitous Technologies, vol. 1, Issue 3, Sep. 11, 2017, 21 pages.

Wu, et al., "EyeNet: A Multi-Task Network for Off-Axis Eye Gaze Estimation and User Understanding", https://arxiv.org/pdf/1908.09060, Aug. 24, 2019, 17 pages.

Yiu, et al., "Deepvog: Open-Source Pupil Segmentation and Gaze Estimation in Neuroscience Using Deep Learning", Journal of Neuroscience Methods 324 108307, 2019, 12 pages.

International Preliminary Report on Patentability for PCT Application No. PCT/US2022/073092, mailed on Jan. 4, 2024, 9 pages.

Office Action for Japanese Application No. 2023-579020 (with English translation), mailed Jan. 28, 2025, 12 pages.

Ishikawa, "Saliency Prediction based on Object Recognition and Gaze Analysis", IEEJ Transactions on Electronics, Information and Systems, vol. 141, Issue 1, 2021, 18 pages (with English translation).

\* cited by examiner

OBJECT OBSERVATION PREDICTION IN IMAGES USING ENCODER-DECODER MODELS

FIELD

Embodiments relate to determining where the user of an augmented reality device is looking in order to track the gaze or eyes of the user.

BACKGROUND

Machine learning techniques using convolutional networks can be used for gaze (e.g., eye direction) prediction and tracking in augmented reality (AR) applications. Convolutional networks can apply several convolutional layers and pooling layers in succession. Starting from a (N×N) high resolution image the convolutional network can produce a spatially pooled feature map of dimension N/m×N/m×F where F is the number of feature channels.

SUMMARY

Implementations relate to using machine learning models (e.g., encoder-decoder models, convolutional neural network (CNN), linear networks, and/or the like) to track object observations in images (e.g., gaze tracking). These machine learned models can also be used to predict characteristics of data where the model is trained in a first configuration and used in a second configuration.

In a general aspect, a device, a system, a non-transitory computer-readable medium (having stored thereon computer executable program code which can be executed on a computer system), and/or a method can perform a process with a method including, in a training phase, training a gaze prediction model including a first model and a second model, the first model and the second model being configured in conjunction to predict segmentation data based on training data, training a third model together with the first model and the second model, the third model being configured to predict a training characteristic using an output of the first model based on the training data, and in an operational phase, receiving operational data and predicting an operational characteristic using the trained first model and the trained third model.

Implementations can include one or more of the following features. For example, the training data can include an image of an eye, the predicted segmentation data can include regions of the eye, and the training characteristic can be a gaze of the eye. The operational data can include an image of an eye captured using an augmented reality (AR) user device and the operational characteristic can be a gaze of the eye. The training of the gaze prediction model can include generating a first feature map based on the training data using the first model, generating a second feature map based on the first feature map using the second model, predicting the segmentation data based on the second feature map, generating a loss associated with the predicted segmentation data, and training at least one of the first model and the second model based on the loss and a loss associated with the training characteristic. The training of the gaze prediction model can include generating a first feature map based on the training data using the first model, predicting the training characteristic based on the first feature map using the third model, generating a loss associated with the predicted training characteristic, and training the third model based on the loss and a loss associated with the segmentation data. The predicting of the operational characteristic can include generating a feature map based on the operational data using the first model and predicting the operational characteristic based on the feature map using the third model. The first model can be a first convolutional neural network (CNN), the second model can be a second CNN including at least one skip connection from the first CNN, and the third model can be a linear neural network. The second model can be removed from the gaze prediction model for use in the operational phase. The training of the gaze prediction model can include changing at least one of parameters, features, and characteristics of features associated with at least one of the first model, the second model, and the third model. The method can further include prior to the operational phase, in a calibration phase, training at least one of the first model, the second model, and the third model based on user data captured using an AR user device.

In another general aspect, a device, a system, a non-transitory computer-readable medium (having stored thereon computer executable program code which can be executed on a computer system), and/or a method can perform a process with a method including generating a first feature map based on training data using a first model, generating a second feature map based on the first feature map using a second model, predicting segmentation data based on the second feature map, generating a first loss associated with the predicted segmentation data, predicting a training characteristic based on the first feature map using a third model, generating a second loss associated with the predicted training characteristic, and training at least one of the first model, the second model and the third model based on the first loss and the second loss.

Implementations can include one or more of the following features. For example, the training data can include an image of an eye, the predicted segmentation data can include regions of the eye, and the training characteristic can be a gaze of the eye. The first model can be a first convolutional neural network (CNN), the second model can be a second CNN including at least one skip connection from the first CNN, and the third model can be a linear neural network. The method of claim 11, wherein the second model can be removed for use in an operational phase. The training of at least one of the first model, the second model and the third model can include changing at least one of parameters, features, and characteristics of features associated with at least one of the first model, the second model, and the third model. The segmentation data can be a process including separating data associated with the second feature map into distinct groups. The predicting of the segmentation data can include a detection process and a suppression process.

In yet another general aspect, a device, a system, a non-transitory computer-readable medium (having stored thereon computer executable program code which can be executed on a computer system), and/or a method can perform a process with a method including generating a feature map based on operational data using a trained first model and predicting a characteristic based on the feature map using a trained second model, wherein the training of the first model and the second model includes using a third model used to predict segmentation data during the training and removing the third model to predicting the characteristic.

Implementations can include one or more of the following features. For example, the operational data can include an image of an eye captured using an augmented reality (AR) user device and the operational characteristic can be a gaze of the eye. The method can further include further training at least one of the trained first model, the trained second model, and the third model based on user data captured using an AR user device.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. For example, the relative thicknesses and positioning of regions and/or structural elements may be reduced or exaggerated for clarity. The use of similar or identical reference numbers in the various drawings is intended to indicate the presence of a similar or identical element or feature.

DETAILED DESCRIPTION

Disclosed techniques provide object observation (e.g., gaze) prediction and tracking for objects in recently obtained (e.g., captured) images with higher accuracy and easier customization than conventional systems Machine learning techniques using convolutional networks can be used for data characteristic prediction, gaze (e.g., eye direction) tracking, and/or the like in augmented reality (AR) applications and other live data capture systems. These convolutional networks can require a large quantity of training data. Real training data can be in limited supply in some scenarios including gaze tracking applications. Therefore, implementations may augment real training data with synthetic training data, e.g., computer generated images. However, some object observation tasks, including gaze tracking, can involve many variations and corner cases due to differences in human eyes (e.g., iris textures, pupil shapes/sizes, and/or the like), make-up, skin color/texture variations, and the like. These variations are difficult to capture in synthetic (e.g., computer generated) data and limited in real data. As a result, the robustness of the associated trained models including AR systems can suffer from inadequate (inaccurate) predictions.

Example implementations can generate robust yet low complexity gaze tracking models that enable real-time operation on AR systems and can accurately process the aforementioned variations. Machine learning techniques using a model, an algorithm, a network, a neural network and/or a convolutional neural networks (CNN) can be used in gaze tracking systems. These models can be trained in a first configuration and operationally used in a second configuration. The first model configuration can be advantageous for robust training using limited real training data, the result of the training can be applied in the second configuration, which can be advantageous in operation or use cases by reducing resource (e.g., processor, memory and/or the like) utilization while still generating accurate predictions.

Figure 1:
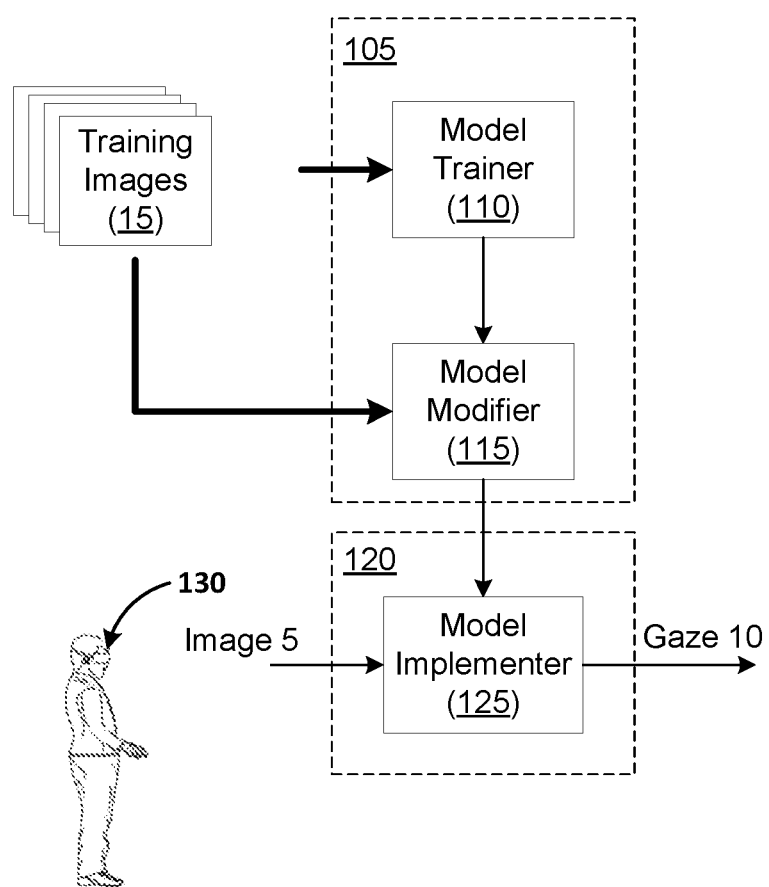
FIG. 1 illustrates a block diagram of a gaze tracking system according to an example embodiment.

FIG. 1 illustrates a block diagram of a gaze tracking system according to an example embodiment. As shown in FIG. 1, a gaze tracking system can include a first computing device 105 and a second computing device 120. The first computing device 105 can be an example of a computing device 700 or 750 illustrated in FIG. 7. The second computing device can be an example of computing device 790 illustrated in FIG. 7. The first computing device 105 includes a model trainer 110 block and a model modifier 115 block and the second computing device 120 can include a model implementer 125 block. The first computing device 105 can be associated with a product manufacturer and can be implemented in, for example, a server, a networked computer, a main frame computer, a local computer, and/or the like. The second computing device 120 can be a user device and can be implemented in, for example, an AR headset (e.g., AR device 130), a mobile device, a laptop device a cell phone, a personal computer, and/or the like. The second computing device 120 can have limited computing resources as compared to the first computing device 105.

The model trainer 110 can be configured to train a model (e.g., a statistical model, a neural network (e.g., CNN), a linear network, an encoder-decoder network, and/or the like). During training, the model can be configured to predict an object characteristic (e.g., gaze) and segments (or segmentation). Object characteristic (e.g., gaze) prediction can predict coordinates for the object characteristic (e.g., gaze). For example, gaze prediction can predict what coordinates of an image a human user is looking at. As another example could be body pose estimation. For example, coordinates of the joints of the human body can be estimated and, at the same time, the object of interest (e.g., a leg) can be segmented. At run-time, the coordinates can be output without the segmentation in order to save computation time. The model trainer 110 can generate a trained model using training data.

As shown in FIG. 1, the training data can be a plurality of training images 15. The training images 15 can be used to train the model for gaze prediction and segmentation prediction for each training image. For example, the model can include a plurality of weights that are modified after each training iteration until a loss is minimized and/or a change in loss or losses associated with the model is minimized.

The model modifier 115 can be configured to modify a model that has been trained using the model trainer 110. For example, the trained model can include two or more models (referred to as a compound model) and the model modifier 115 can operationally disconnect (or remove) at least one of the two or more models from the compound model. In an example implementation, the trained model is a compound model (e.g., two or more models that were jointly trained, trained in conjunction, and/or optimized together) that can include a first model (sometimes called an inference or an encoder), a second model (sometimes called a segmentation model or a decoder), and a third model configured to predict an object characteristic (e.g., gaze). The first model can be configured to generate (or infer) a feature map. The second model can be configured to predict segmentation from the feature map. The third model can be configured to predict a characteristic (e.g., gaze) from the feature map. Segmentation may only be used in training the compound model (e.g., the model trainer 110). Therefore, the model modifier 115 can be configured to modify the trained compound model by operationally disconnecting (or removing) the second model from the compound model. Operationally disconnecting (or removing) the second model can also include having a first trained compound model with the second model and a second trained compound model without the second model that retains the trained data (e.g., parameters, weights, and/or the like).

The model modifier 115 can also be configured to modify parameters associated with the trained model (or compound model). The model modifier 115 can also tune the trained model (e.g., further modifying parameters) using the plurality of training images 15. Tuning the trained model can be performed after the trained model is modified. For example, tuning the abovementioned trained compound model can include performing a training operation using the first model and the third model.

The model implementer 125 (e.g., associated with the second computing device 120) can include the trained (and possibly tuned) model (e.g., the compound model or the first model and the third model). Thus, the model implementer 125 may be said to use the model in an operational or gaze prediction phase or mode. The model implementer 125 can be configured to determine (e.g., predict) a gaze 10 associated with an image 5. The image 5 can be captured by a computing device, such as AR device 130. Therefore, the gaze 10 can be associated with a user of the AR device 130. In an example implementation, the output of the first network is input to the third network and the third network can predict the gaze 10. The model implementer 125 can be configured to calibrate the model (e.g., further modifying the weights) based on images associated with a user of the AR device 130. In this implementation, the model implementer 125 may include both the trained model and the modified trained model. In this implementation, the trained model can be further trained by the user (or a technician working with the user) and the parameters and/or weights associated with the further trained model can be used by the modified trained model. In some implementations, the model implementer 125 may have access to the trained model, e.g., at the first computing device 105, for the calibration.

The training images can be real data (e.g., images of eyes) and/or synthetic data (e.g., computer generated images of an eye). Real data and/or synthetic data may be in the form (image[i], gaze_direction[i], i=1, . . . , K), where direction is represented by x,y coordinates. Real data and/or synthetic data can also be in the form (image[i], gaze_direction[i], segmentation[i], i=1, . . . K) where the i-th segmentation data (associated with the i-th image) includes a plurality of data points each identifying eye regions (e.g., pupil, iris, sclera, and/or the like). Segmentation labels can be crowdsourced or generated through computationally complex, perhaps human-assisted ML techniques. Real data can be time-consuming to obtain and therefore obtaining sufficient real data to robustly train models associated with a gaze tracking system can be impractical. To address this issue, example implementations can train a first model (or first compound model) that can be robustly trained using the limited real data and the synthetic data. This first model can then be modified into a second model (or second compound model) for use in a user device including an operational gaze tracking system. The second model may use less processing resources than the first model, making the second model appropriate for resources typically associated with a user device.

Accurate gaze prediction (e.g., x, y coordinates in an image) can rely on obtaining accurate information associated with the pupil, the pupil center, and/or other eye regions. Segmentation data can be a factor in obtaining an accurate gaze prediction. Therefore, in example implementations a gaze-predicting model can be combined with a segmentation model as a compound model (e.g., a gaze and segmentation prediction model). The segmenting portion of the compound model can be used during training (e.g., by the model trainer 110) to regularize and improve the accuracy of the gaze-prediction portion of the compound model. Example implementations can include a compound model as an inference-segmentation model that is sometimes referred to as a multi-resolution encoder-decoder network (e.g., for training and/or calibration) that can be split or decomposed (e.g., by the model modifier 115) into a multi-resolution encoder network (e.g., for gaze tracking using the model implementer 125). In other words, the inference-segmentation model can be split or decomposed (e.g., by the model modifier 115) into an inference model (e.g., for gaze tracking using the model implementer 125).

In an operational phase or gaze tracking mode, the inference model (e.g., the multi-resolution encoder-decoder network with the decoder network removed) can be operated to a feature map used to generate a gaze prediction or gaze outputs (e.g., gaze-direction, gaze-point, and/or the like). In this mode the inference model may not include skip connection(s) and other computations needed to realize the segmentation model outputs of the inference-segmentation model. While the inference model has substantially lower complexity than the inference-segmentation model, the inference model includes the same training parameters and/or weights. Therefore, the parameters and/or weights identified in the training phase of the inference-segmentation model can be used in the inference model to obtain the gaze prediction or gaze outputs. In other words, a gaze prediction using the inference-segmentation model (e.g., during the training phase) should be the same as a gaze prediction using the inference model (e.g., in the implementation or operational phase).

In some implementations, the inference-segmentation model can be used in a calibration phase or calibration mode. For example, the inference-segmentation model can be fine-tuned to a specific user. The calibration mode may be implemented by the model modifier 115 and/or the model implementer 125. Operation of the first computing device 105 can be referred to as a training phase or training mode and operation of the second computing device 120 can be referred to as an operational phase or operational mode.

Figure 2B:
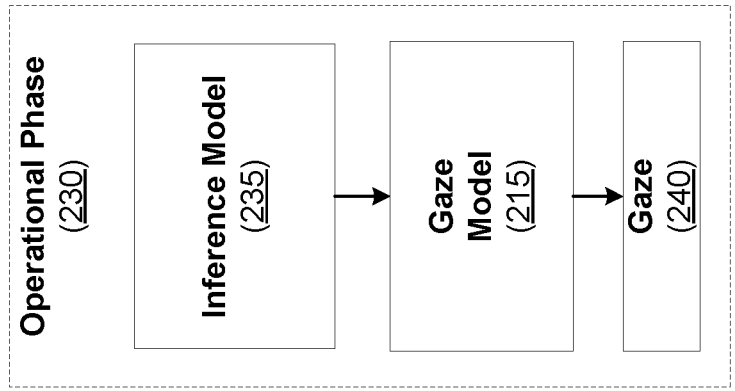
FIG. 2B illustrates a block diagram of using the gaze tracking system according to an example embodiment.
Figure 2A:
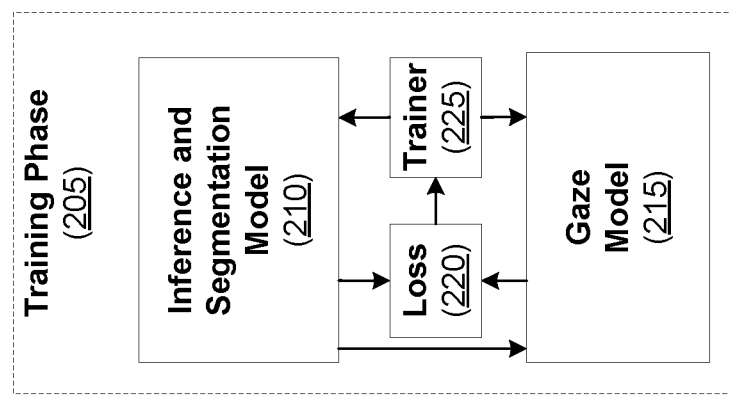
FIG. 2A illustrates a block diagram of training a gaze tracking system according to an example embodiment.

FIG. 2A can be used to further describe the training phase, e.g., performed by the model trainer 110 of FIG. 1, and FIG. 2B can be used to further describe the operational phase, e.g., performed by the model implementer 125 of FIG. 1. FIG. 2A illustrates a block diagram of training a gaze tracking system according to an example embodiment. As shown in FIG. 2A, the gaze tracking system can include an inference and segmentation model 210 block, a gaze model 215 block, a loss 220 block, and a trainer 225 block in a training phase 205.

The inference and segmentation model 210 (illustrated in more detail in FIG. 3) can be configured to predict segmentation of an image. Segmentation or segmentation data can be used to identify (or help identify) objects or regions, such as eye regions (e.g., pupil, iris, sclera, and/or the like). The segmentation (e.g., eye regions) can be used to predict (or help predict) gaze. The predicted segmentation can be used to train the inference and segmentation model 210 and/or the gaze model 215. The inference and segmentation model 210 can include two portions, an inference portion, and a segmentation portion. The inference portion of the inference and segmentation model 210 can be a neural network (e.g., a first neural network in the gaze tracking system). The inference portion of the inference and segmentation model 210 can be referred to as an encoder. The inference portion takes an image and outputs a feature map corresponding to the image. Each layer of a network extracts features associated with the input image. Each layer constructs higher-order features using, one or more convolution, ReLu and pooling functions. The feature map (sometimes called an activation map) can be the final output or the output of the last layer of the network. The segmentation portion of the inference and segmentation model 210 can be a neural network (e.g., a second neural network in the gaze tracking system). The segmentation portion of the inference and segmentation model 210 can be referred to as a decoder.

The gaze model 215 (see FIGS. 3 and 4 for additional details) can be configured to predict gaze using, for example, a layered convolutional neural network with no sparsity constraints. As mentioned above, the inference and segmentation model 210 can include a first model (e.g., the inference portion or the encoder) and a second model (e.g., the segmentation portion or the decoder). The gaze model 215 can be a third model where output of the first model (e.g., a feature map) can be the input to the third model. In other words, data generated by the inference portion or encoder portion of an encoder-decoder CNN can be used by a gaze model or a layered convolutional neural network with no sparsity constraints to predict gaze. As mentioned herein, the gaze tracking system can be trained using a segmentation prediction using a segmentation model (e.g., a decoder) based on the feature map of an inference model (e.g., an encoder) in an inference-segmentation model (e.g., an encoder-decoder CNN) and a gaze prediction based on the feature map of the inference model. Including the segmentation prediction during training improves the training of the gaze model, resulting in a more accurate gaze prediction during use.

The loss 220 and the trainer 225 can be used to implement a training and optimization process. The training and optimization process can be configured to generate a loss based on a loss function (of loss 220) and a comparison (by the trainer 225) of the predicted segmentation and predicted gaze to ground-truth data. For example, loss 220 can be calculated by a loss algorithm as ($Loss_g + \lambda Loss_s$), where $Loss_g$ is gaze loss, $Loss_s$ is segmentation loss, and $\lambda$ can be the Lagrange multiplier. Then the trainer 225 can be configured to minimize the resultant loss (e.g., ($Loss_g + \lambda Loss_s$)). Typically, the ground-truth is data associated with the training data (e.g., training images 15). In other words, each training image 15 can have associated segmentation prediction data and gaze direction data (e.g., developed by a user, developed by a proved gaze algorithm, and/or the like). In one implementation, the gaze loss is the difference between the predictions of the gaze model 215 for the training images and the gaze direction data for the training images and the segmentation loss is the difference between the segmentation predictions of the inference and segmentation model 210 and the segmentation prediction data for the training images. In another example implementation, the inference and segmentation model 210 may be configured to predict gaze based on the segmentation prediction. In such an implementation, calculating loss 220 may include comparing a gaze predicted by the second neural network (or decoder) based on segmentation can be compared to the gaze predicted by the third neural network (or layered convolutional neural network with no sparsity constraints).

The loss 220 can be a number indicating how bad the model's prediction was on a single example (e.g., training image 15). If the model's prediction (e.g., segmentation prediction and/or gaze prediction) is perfect, the loss is zero; otherwise, the loss is greater. The goal of training (e.g., trainer 225) is to find (e.g., change adjust, or modify) parameters (e.g., weights and biases) that result in low loss, on average, across all training examples. The loss algorithm can be a squared loss, a mean squared error loss, and/or the like. Training can include modifying parameters associated with at least one of the inference and segmentation model 210 (e.g., the first model and the second model) or the gaze model 215 (e.g., the third model) used to predict the gaze based on the results of the loss 220.

Modifying the first model, the second model and/or the third model can include changing features, characteristics of features (e.g., key features or importance of a feature), and/or hyperparameters. Non-limiting examples of features, characteristics of features, and hyperparameters include: bounding box proposals, aspect ratios, data augmentation options, loss functions, depth multipliers, number of layers, image input size (e.g., normalization), anchor boxes, location of anchor boxes, number of boxes per cell, feature map size, convolution parameters (e.g., weights), and/or the like.

The training and optimization process performed by the trainer 225 can be configured based on a desired trade-off between computational time spent and desired quality of results. In general, the number of iterations used during the training process yields approximately logarithmic gains in accuracy, so it can be preferred to use an automatic threshold to stop further optimization. When favoring quality of results, the automatic threshold can be set to a predetermined value of reconstruction error, for example, by calculating the mean squared error, but other methods can also be used. The automatic threshold can be set to limit the training and optimization process to a predetermined number of iterations. In some implementations, a combination of these two factors can be used.

FIG. 2B illustrates a block diagram of using the gaze tracking system according to an example embodiment. As shown in FIG. 2B, the gaze tracking system can include an inference model 235 block, the gaze model 215 and a gaze 240 block. As discussed throughout this specification, a trained model (e.g., encoder-decoder CNN) can be modified to operationally disconnect (or remove) the portion of the model used for segmentation, e.g., the decoder portion. This modified model can be used in an operational phase 230 to significantly reduce the complexity and use of processing resources. The inference model 235 can be consistent with inference model of the trained inference and segmentation model 210.

Accordingly, the inference model 235 (see FIG. 4 for additional details) can be configured to generate a feature map associated with an image (e.g., image 5). The gaze model 215 (see FIG. 4 for additional details) can be configured to predict the gaze 240 based on the feature map. The gaze 240 can be used to determine the gaze of a user of an AR device (e.g., AR device 130).

As mentioned above, generating an accurate gaze prediction can include obtaining accurate information associated with the pupil, the pupil center, and/or other eye regions. Segmentation data can be a factor in obtaining an accurate gaze. If a gaze-predicting model can be combined with a segmentation model as a compound model (e.g., a gaze and segmentation prediction model). The segmenting portion of the compound model can be used during training (e.g., by the model trainer 110) to regularize and improve the accuracy of the gaze-prediction portion of the compound model. Example implementations can include a compound model as an inference-segmentation model that is sometimes referred to as a multi-resolution encoder-decoder network (e.g., for training and/or calibration) that can be split or decomposed (e.g., by the model modifier 115) into a multi-resolution encoder network (e.g., for gaze tracking using the model implementer 125). In other words, the inference-segmentation model can be split or decomposed (e.g., by the model modifier 115) into an inference model (e.g., for gaze tracking using the model implementer 125).

For example, at the coarsest resolution of the inference portion of the inference-segmentation model, gaze model can be added to generate or predict gaze-outputs. In a training phase the inference-segmentation model can be utilized to generate input to a gaze model and a segmentation prediction. The gaze model can be used to generate a gaze prediction. The gaze prediction and the segmentation prediction can be input into a loss function to train the inference-segmentation model and/or the gaze model with the benefit of segmentation regularization. Regularization can be a form of regression, that constrains/regularizes the coefficient (e.g., weights and biases) estimates between zero and an upper limit, e.g., one. In other words, this technique discourages learning a more complex or flexible model, so as to avoid the risk of overfitting.

Figure 3:
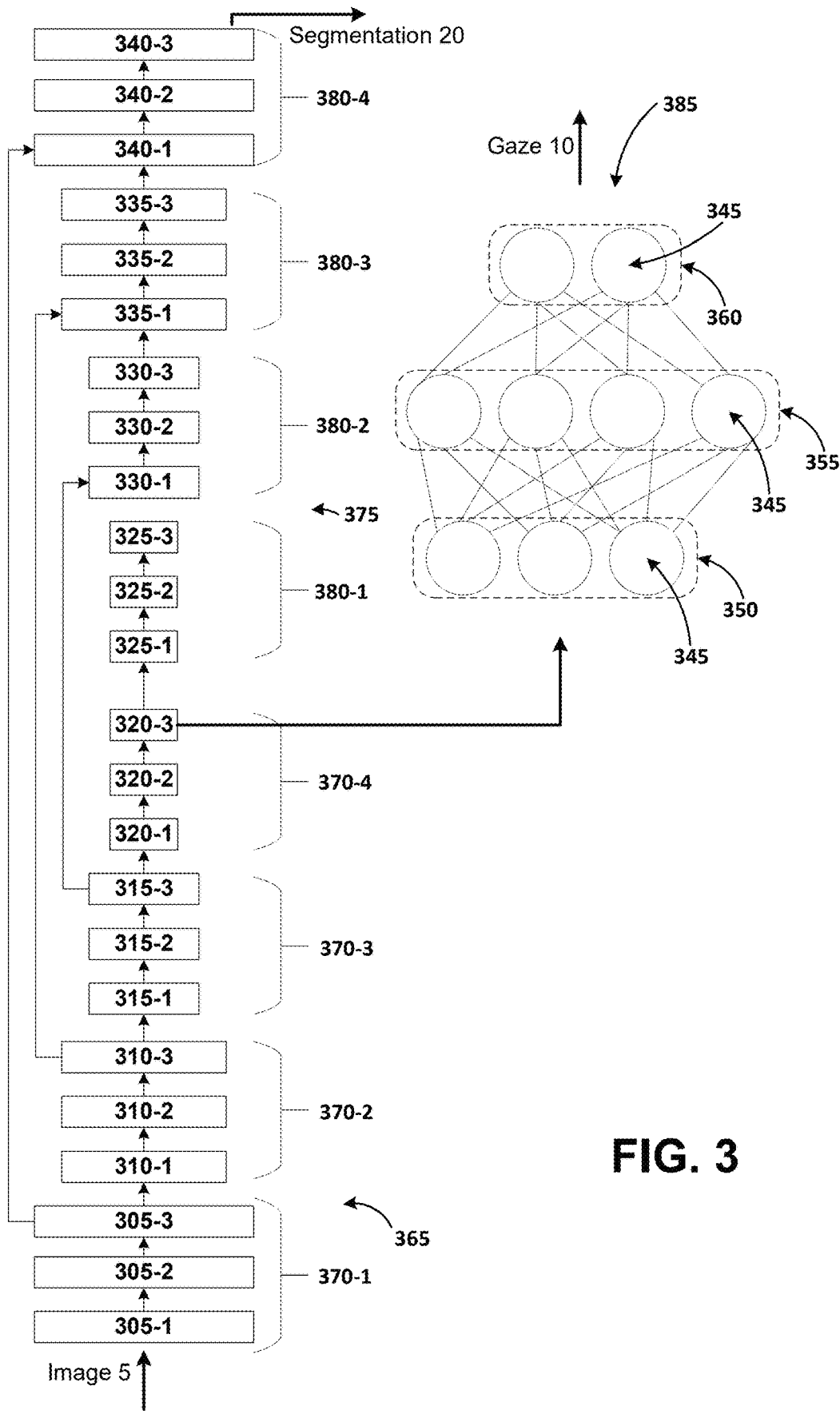
FIG. 3 illustrates a block diagram of a gaze prediction model according to an example embodiment.

FIG. 3 illustrates a block diagram of an inference-segmentation model (e.g., a multi-resolution encoder-decoder network) according to an example embodiment. FIG. 3 is an example of the inference and segmentation model 210 and the gaze model 215 of FIG. 2A. An inference model and a segmentation model can each include at least one convolution layer(s) or convolution(s). For example, as shown in FIG. 3, an inference model 365 can include four (4) convolution layers each including three (3) convolutions where a first convolution layer 370-1 includes convolutions 305-1, 305-2, 305-3, a second convolution layer 370-2 includes convolutions 310-1, 310-2, 310-3, a third convolution layer 370-3 includes convolutions 315-1, 315-2, 315-3, and a fourth convolution layer 370-4 includes convolutions 320-1, 320-2, 320-3. Further, as shown in FIG. 3, a segmentation model 375 can include four (4) convolution layers each including three (3) convolutions, where a first convolution layer 380-1 includes convolutions 325-1, 325-2, 325-3, a second convolution layer 380-2 includes convolutions 330-1, 330-2, 330-3, a third convolution layer 380-3 includes convolutions 335-1, 335-2, 335-3, and a fourth convolution layer 380-4 includes convolutions 340-1, 340-2, 340-3. The inference-segmentation model can include skip connection (s) (e.g., the output of convolution 305-3 can be communicated as input to convolution 340-1) and other computations needed to realize the segmentation model outputs.

A convolution layer (e.g., convolution layer 370-1, 370-2, 370-3, 370-4, 380-1, 380-2, 380-3, and/or 380-4) or convolution can be configured to extract features from an image 5. Features can be based on color, frequency domain, edge detectors, and/or the like. A convolution can have a filter (sometimes called a kernel) and a stride. For example, a filter can be a 1×1 filter (or 1×1×n for a transformation to n output channels, a 1×1 filter is sometimes called a pointwise convolution) with a stride of 1 which results in an output of a cell generated based on a combination (e.g., addition, subtraction, multiplication, and/or the like) of the features of the cells of each channel at a position of the M×M grid. In other words, a feature map having more than one depth or channel is combined into a feature map having a single depth or channel. A filter can be a 3×3 filter with a stride of 1 which results in an output with fewer cells in/for each channel of the M×M grid or feature map. The output can have the same depth or number of channels (e.g., a 3×3×n filter, where n=depth or number of channels, sometimes called a depthwise filter) or a reduced depth or number of channels (e.g., a 3×3×k filter, where k<depth or number of channels). Each channel, depth, or feature map can have an associated filter. Each associated filter can be configured to emphasize different aspects of a channel. In other words, different features can be extracted from each channel based on the filter (this is sometimes called a depthwise separable filter). Other filters are within the scope of this disclosure.

Another type of convolution can be a combination of two or more convolutions. For example, a convolution can be a depthwise and pointwise separable convolution. This can include, for example, a convolution in two steps. The first step can be a depthwise convolution (e.g., a 3×3 convolution). The second step can be a pointwise convolution (e.g., a 1×1 convolution). The depthwise and pointwise convolution can be a separable convolution in that a different filter (e.g., filters to extract different features) can be used for each channel or each depth of a feature map. In an example implementation, the pointwise convolution can transform the feature map to include c channels based on the filter. For example, an 8×8×3 feature map (or image) can be transformed to an 8×8×256 feature map (or image) based on the filter. In some implementation more than one filter can be used to transform the feature map (or image) to an M×M×c feature map (or image).

A convolution can be linear. A linear convolution describes the output, in terms of the input, as being linear time-invariant (LTI). Convolutions can also include a rectified linear unit (ReLU). A ReLU is an activation function that rectifies the LTI output of a convolution and limits the rectified output to a maximum. A ReLU can be used to accelerate convergence (e.g., more efficient computation).

In an example implementation, a combination of depthwise convolutions and depthwise and pointwise separable convolutions can be used. Each of the convolutions can be configurable (e.g., configurable feature, stride and/or depth). For example, the inference model 365 can include convolutions 305-1, 305-2, 305-3, 310-1, 310-2, 310-3, 315-1, 315-2, 315-3, 320-1, 320-2, and 320-3 that can transform the image 5 into a first feature map. The segmentation model 375 can include convolutions 325-1, 325-2, 325-3, 330-1, 310-2, 330-3, 335-1, 335-2, 335-3, 340-1, 340-2, and 340-3 that can incrementally transform the first feature map into a second feature map. This incremental transformation can cause the generation of bounding boxes (regions of the feature map or grid) of differing sizes which can enable the detection of objects of many sizes. Each cell can have at least one associated bounding box. In an example implementation, the larger the grid (e.g., number of cells) the fewer the number of bounding boxes per cell. For example, the largest grids can use three (3) bounding boxes per cell and the smaller grids can use six (6) bounding boxes per cell.

The second feature map can be used to predict segmentation 20. Predicting segmentation can include detection (e.g., using a detection layer not shown) and suppression (e.g., a suppression layer not shown). Detection can include using data associated with each bounding box associated with the second feature map (e.g., the output of, at least, convolution 340-3). The data can be associated with the features in the bounding box. The data can indicate an object in the bounding box (the object can be no object or a portion of an object). An object can be identified by its features. The data, cumulatively, is sometimes called a class or classifier. The class or classifier can be associated with an object. The data (e.g., a bounding box) can also include a confidence score (e.g., a number between zero (0) and one (1)).

After detection, the results can include a plurality of classifiers indicating a same object. In other words, an object (or a portion of an object) can be within a plurality of overlapping bounding boxes. However, the confidence score for each of the classifiers can be different. For example, a classifier that identifies a portion of an object can have a lower confidence score than a classifier that identifies a complete (or substantially complete) object. The detection can further include discarding the bounding boxes without an associated classifier. In other words, the detection can discard bounding boxes without an object in them.

Suppression can include sorting the bounding boxes based on the confidence score and selecting the bounding box with the highest score as the classifier identifying an object. The suppression layer can repeat sorting and selection process for each bounding box having a same, or substantially similar, classifier. As a result, the suppression layer can include data (e.g., a classifier) identifying each object in the input image.

In an augmented reality (AR) gaze tracking application, eye regions to be identified can be limited to eye regions captured (e.g., in an image) by the AR application. For example, example implementations use trained ML models to identify any possible eye regions (e.g., iris textures, pupil shapes/sizes, and/or the like) to help determine or confirm a user's gaze.

Example implementations can include a third model 385. The third model 385 can use the first feature map (e.g., the output of convolution 320-3) to predict gaze 10. As shown in FIG. 3, the third model 385 can include a plurality of layers in a convolutional neural network with no sparsity constraints. The layered neural network can include three (s) layers 350, 355, 360. Each layer 350, 355, 360 can be formed of a plurality of neurons 345. In this implementation, no sparsity constraints have been applied. Therefore, all neurons 345 in each layer 350, 355, 360 are networked to all neurons 345 in any neighboring layers 350, 355, 360.

The third model 385 shown in FIG. 3 may not be computationally complex due to the small number of neurons 345 and layers. In other words, the computational complexity can be related to the number of neurons 345. An initial sparsity condition can be used to lower the computational complexity of the neural network. For example, if a neural network is functioning as an optimization process, the neural network approach can work with high dimensional data by limiting the number of connection between neurons and/or layers. Further, the convolutional neural network can also make use of pooling or max-pooling to reduce the dimensionality (and hence complexity) of the data that flows through the neural network. Other approaches to reduce the computational complexity of convolutional neural networks can be used.

Figure 4:
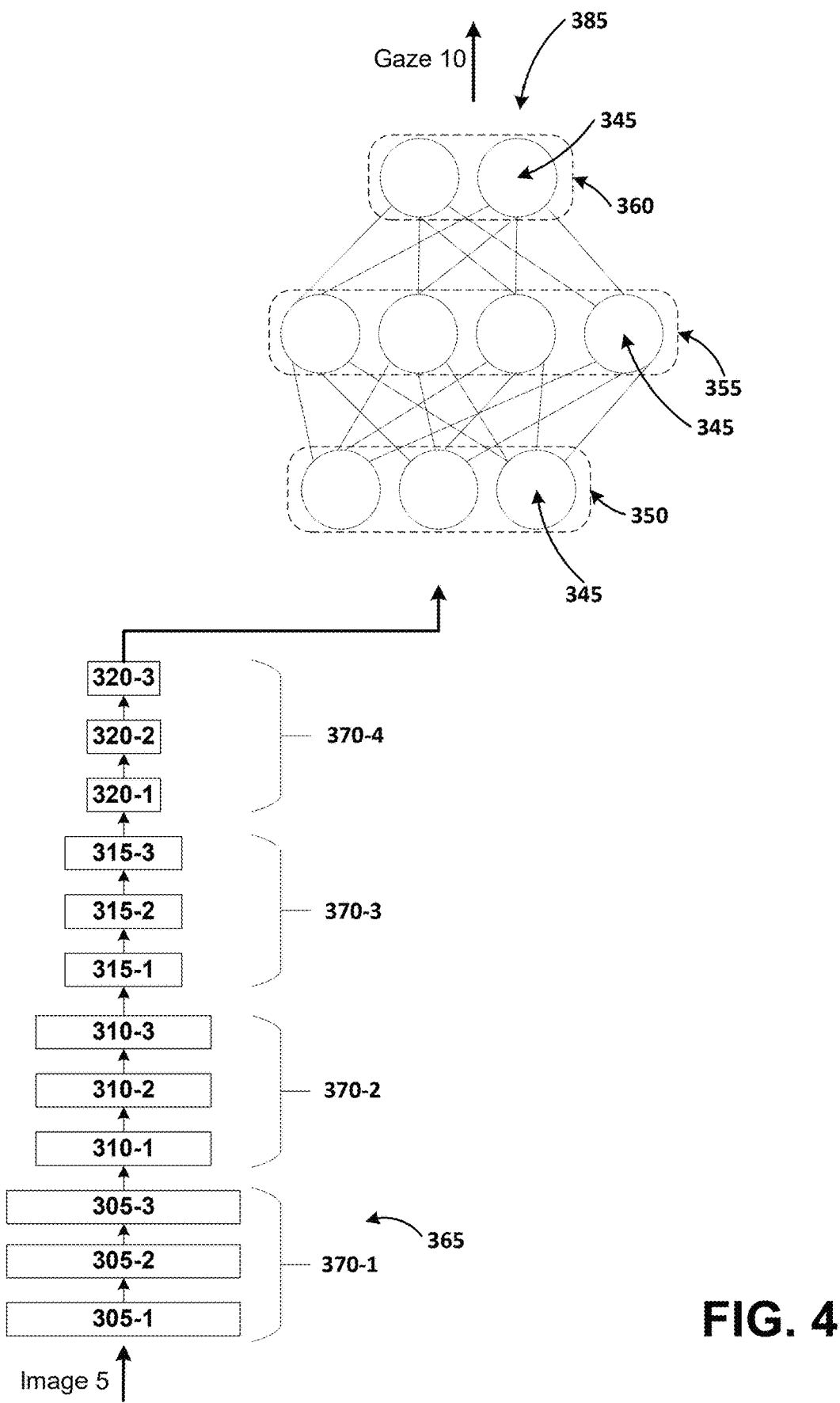
FIG. 4 illustrates a block diagram of a gaze prediction model according to an example embodiment.

FIG. 4 illustrates a block diagram of an inference model (e.g., a multi-resolution encoder network) according to an example embodiment. The inference model is an example of the inference model 235 in FIG. 2B. In this implementation, no segmentation model (e.g., decoder) is included. Therefore, this implementation is used to predict gaze without predicting segmentation. By not predicting segmentation, processing an image to predict gaze is simplified and significantly faster (e.g., uses fewer processor cycles).

An inference model (e.g., an encoder) can include at least one convolution layer(s) or convolution(s). For example, as shown in FIG. 4, an inference model 365 can include four (4) convolution layers each including three (3) convolutions where a first convolution layer 370-1 includes convolutions 305-1, 305-2, 305-3, a second convolution layer 370-2 includes convolutions 310-1, 310-2, 310-3, a third convolution layer 370-3 includes convolutions 315-1, 315-2, 315-3, and a fourth convolution layer 370-4 includes convolutions 320-1, 320-2, 320-3. The inference model 365 of FIG. 4 is similar to the inference model 365 as described in FIG. 3. In some implementations, the inference model 365 of FIG. 4 is different than the inference model 365 as described in FIG. 3 in that the inference model 365 of FIG. 4 does not include skip connection(s).

A second model 385 (the third model 385 of FIG. 3) can use the first feature map (e.g., the output of convolution 320-3) to predict gaze 10. As shown in FIG. 4, the second model 385 can include a plurality of layers in a convolutional neural network with no sparsity constraints. The layered neural network can include three (s) layers 350, 355, 360. Each layer 350, 355, 360 can be formed of a plurality of neurons 345. In this implementation, no sparsity constraints have been applied. Therefore, all neurons 345 in each layer 350, 355, 360 are networked to all neurons 345 in any neighboring layers 350, 355, 360. The example neural network shown in FIG. 4 is not computationally complex due to the small number of neurons 345 and layers. In other words, the computational complexity can be related to the number of neurons 345. Further, the convolutional neural network can also make use of pooling or max-pooling to reduce the dimensionality (and hence complexity) of the data that flows through the neural network. Other approaches to reduce the computational complexity of convolutional neural networks can be used.

The parameters of the neural networks illustrated in FIG. 3 and FIG. 4 can be chosen to minimize model (e.g., encoder and decoder) complexity while retaining overall accuracy. For example, unlike a typical multi-resolutional encoder-decoder network model, the example encoder can have distinct and asymmetric parameters when compared to the decoder. For example, where each level of the decoder can use two convolution layers, corresponding layers of the encoder can use a single convolutional layer, smaller convolution size, and/or the like.

The above described implementations are described using a gaze tracking system of an AR user device. However, other implementations used for identifying objects can benefit from training and use of the above neural network(s). These implementations can include systems that identify an object (e.g., the features of an eye in the gaze tracking system) and attributes associated with the object (e.g., the position/direction of the pupil in the gaze tracking system). For example, a system for identifying direction of motion (e.g., of vehicles, humans (or portions of humans), weather (e.g., wind, snow, rain, clouds and/or the like), feature (e.g., color, size, and/or the like) variability of a product in manufacturing, and/or the like may utilize the techniques described in this description.

In a training phase or training mode, example implementations can include training a multi-resolution encoder-decoder network including a first neural network and a second neural network, the first neural network and the second neural network being configured to predict segmentation data based on training data and training a third neural network (e.g., a layered neural network) together with the first neural network and the second neural network, the third neural network being configured to predict a training characteristic (e.g. eye gaze) based on the training data.

Figure 5:
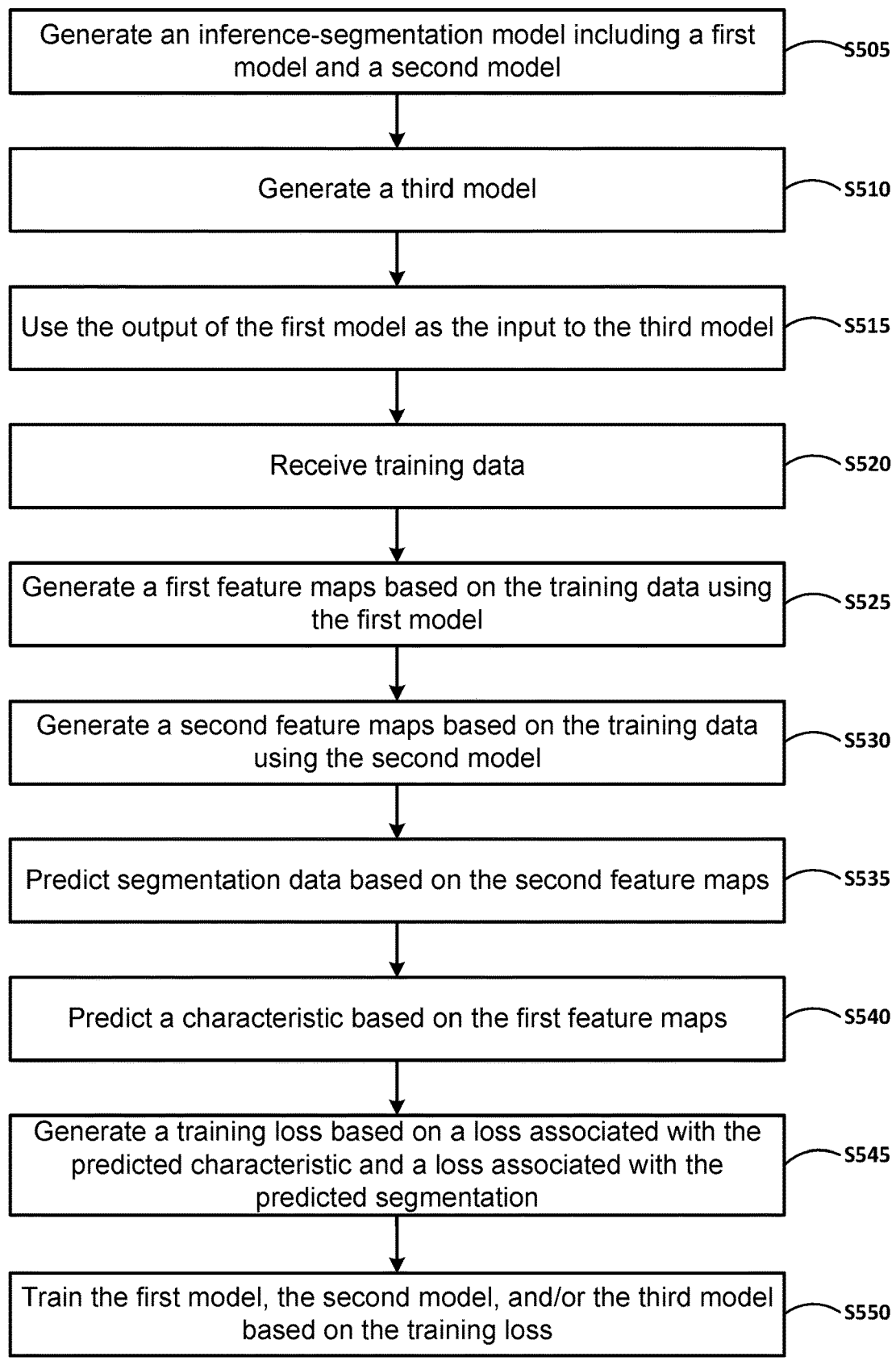
FIG. 5 illustrates a method of training a gaze prediction model according to an example embodiment.

FIG. 5 illustrates a method of training a gaze prediction model according to an example embodiment. As shown in FIG. 5, in step S505 an inference-segmentation model (e.g., a multi-resolution encoder-decoder network) including a first model (e.g., a first neural network) and a second model (e.g., a second neural network) is configured. For example, a multi-resolution encoder-decoder network can be configured using a CNN as the encoder and a CNN as the decoder. Alternatively, the multi-resolution encoder-decoder network can be selected from a datastore of encoder-decoder networks.

In step S510 a third model (e.g., a third neural network) is configured. For example, the third model can be a layered neural network, a deep neural network, a dense network, a network including a plurality of layers in a convolutional neural network with no sparsity constraints, and/or the like. The third model can also be selected from a datastore of neural networks. In step S515 the output of the first model is used as the input to the third model. For example, the output of the first model can be directly or indirectly communicatively coupled to the input to the third model. In step S520 training data is received. For example, a plurality of real (captured) images or synthetic (e.g., computer generated) images can be received. The plurality of real and synthetic images include labels for use as ground truth during a training process.

In step S525 first feature maps are generated based on the training data using the first model. In step S530 second feature maps are generated based on the training data using the second model. For example, a feature map can be generated by applying filters or feature detectors to the input image or to the feature map output of prior layers of a neural network.

In step S535 segmentation data is predicted based on the second feature maps. For example, segmentation can include separating data into distinct groups. Segmentation can be a progression from coarse to fine inference. Segmentation can be based on classification, which includes making a prediction for an input image or portions of the input image. Segmentation can include localization/detection, which can identify classes (e.g., eye features) and information regarding the spatial location of those classes. In addition, fine-grained inference can include making dense predictions inferring labels for every pixel, so that each pixel is labeled with the class of its enclosing object or region.

In step S540 a characteristic is predicted based on the first feature map. For example, the third model can process the first feature maps to generate a predicted output (e.g., the characteristic). The characteristic can be an eye gaze prediction. The eye gaze prediction can be an x, y position on a device (e.g., a display screen on an AR user device) or a direction in a real-world environment. The first feature maps can include tokens representing the gaze and other features characterizing the gaze. In this example, the predicted output may be a likelihood that an eye has a particular gaze (e.g., a particular x,y position).

In step S545 a training loss is generated based on a loss associated with the predicted characteristic and a loss associated with the predicted segmentation. For example, the training loss can be calculated as $(Loss_g + \lambda Loss_s)$, where $Loss_g$ is gaze loss, $Loss_s$ is segmentation loss, and $\lambda$ can be the Lagrange multiplier. Typically, ground-truth is data associated with the training data. In other words, each training image can have associated segmentation prediction data and gaze prediction data (e.g., labels developed by a user, developed by a proved gaze algorithm, and/or the like). The loss can be calculated as a squared loss, a mean squared error loss, and/or the like. In another example implementations, a gaze predicted by the second neural network (or decoder) based on segmentation can be compared to the gaze predicted by the third neural network (or layered convolutional neural network with no sparsity constraints).

In step S550 the first model, the second model, and/or the third model are modified based on the training loss (e.g., to minimize $(Loss_g + \lambda Loss_s)$). For example, the goal of training is to find a parameter set (e.g., parameters, weights and/or biases) that result in low loss, on average, across all training examples. Training can include modifying parameters associated with at least one of the first model, the second model, and the third model used to generate the gaze prediction based on the calculated training loss. Finding a parameter set can include changing features and/or characteristics of features (e.g., key features or importance of a feature), hyper-parameters including: box proposals, aspect ratios, data augmentation options, loss functions, depth multipliers, number of layers, image input size (e.g., normalization), anchor boxes, location of anchor boxes, number of boxes per cell, feature map size, convolution parameters (e.g., weights), and/or the like.

In an operational phase or operational mode, example implementations can include receiving operational data and predicting an operational characteristic (e.g., eye gaze) using a trained first model (e.g., an inference model, an encoder, and the like) and a trained second model (e.g., a gaze prediction model, a layered neural network, and the like).

Figure 6:
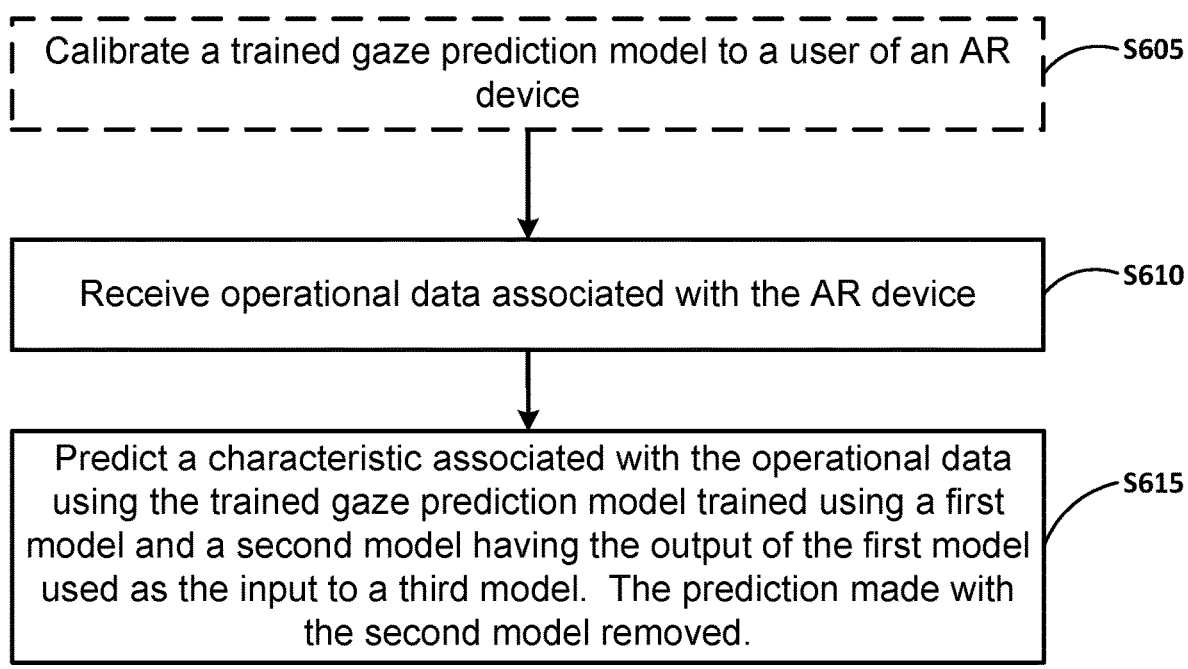
FIG. 6 illustrates a method of using a trained gaze prediction model according to an example embodiment.

FIG. 6 illustrates a method of using a trained gaze prediction model according to an example embodiment. As shown in FIG. 6, in step S605 (the dashed lines indicating step S605 is optional) a trained gaze prediction mode is calibrated to a user of an AR device. For example, a training process (e.g., similar to the method described with regard to FIG. 5) can be performed while the user is using the AR device. In this implementation, the training data can be images generated by the AR device while the user uses the AR device. In step S610 operational data is received. For example, the AR device can use a camera to capture an image of the user's eye(s). The captured image being the operational data.

In step S615 a characteristic associated with the operational data is predicted using a trained multi-resolution encoder-decoder network trained using a first neural network and a second neural network having the output of the first neural network used as the input to a third neural network. The prediction made with the second neural network removed. For example, the neural network of FIG. 3 can be used when training the encoder-decoder network of a gaze tracking system and the neural network of FIG. 4 can be used when operating the gaze tracking system.

Figure 7:
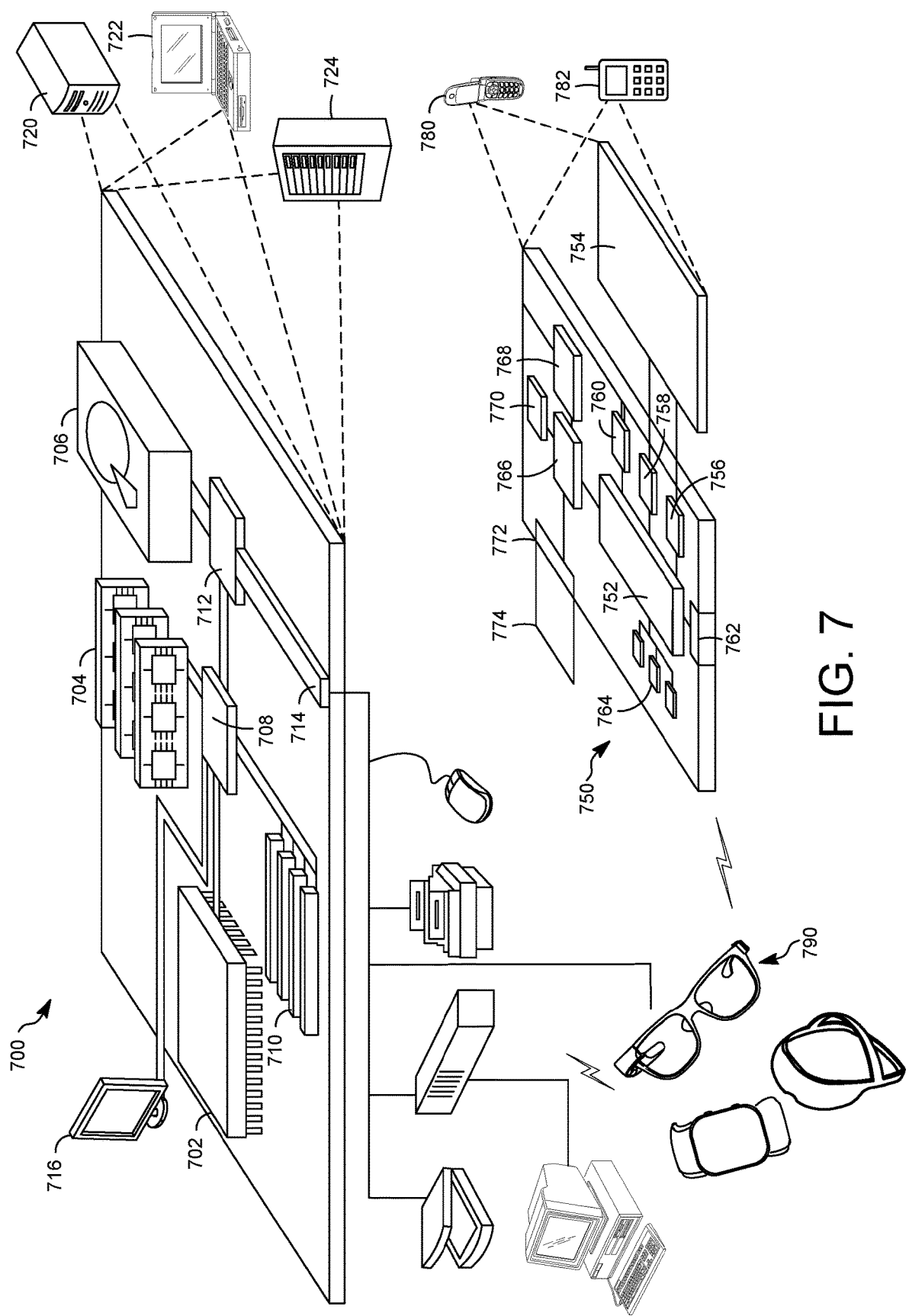
FIG. 7 shows an example of a computer device and a mobile computer device according to at least one example embodiment.

FIG. 7 illustrates an example of a computer device 700 and a mobile computer device 750, which may be used with the techniques described here (e.g., to implement the first computing device 105, the second computing device 120, and other resources used to implement the techniques described herein). The computing device 700 includes a processor 702, memory 704, a storage device 706, a high-speed interface 708 connecting to memory 704 and high-speed expansion ports 710, and a low-speed interface 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of functions is example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display), and LED (Light Emitting Diode) or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750 or may also store applications or other information for device 750. Specifically, expansion memory 774 may include instructions to carry out or supplement the processes described above and may include secure information also. Thus, for example, expansion memory 774 may be provided as a security module for device 750 and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 790 to generate an augmented environment for viewing inserted content within the physical space. For example, one or more sensors included on a computing device 750 or other computing device depicted in the figure, can provide input to the AR headset 790 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 750 can use the sensors to determine an absolute position and/or a detected rotation of the computing device in the AR space that can then be used as input to the AR space. For example, the computing device 750 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 750 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the AR space can cause a particular action to occur in the AR space.

In some implementations, a touchscreen of the computing device 750 can be rendered as a touchpad in AR space. A user can interact with the touchscreen of the computing device 750. The interactions are rendered, in AR headset 790 for example, as movements on the rendered touchpad in the AR space. The rendered movements can control virtual objects in the AR space.

In some implementations, one or more output devices included on the computing device 750 can provide output and/or feedback to a user of the AR headset 790 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the AR space. In the example of the laser pointer in an AR space, the computing device 750 appears as a virtual laser pointer in the computer-generated, 3D environment. As the user manipulates the computing device 750, the user in the AR space sees movement of the laser pointer. The user receives feedback from interactions with the computing device 750 in the AR environment on the computing device 750 or on the AR headset 790. The user's interactions with the computing device may be translated to interactions with a user interface generated in the AR environment for a controllable device.

In some implementations, a computing device 750 may include a touchscreen. For example, a user can interact with the touchscreen to interact with a user interface for a controllable device. For example, the touchscreen may include user interface elements such as sliders that can control properties of the controllable device.

Computing device 700 is intended to represent various forms of digital computers and devices, including, but not limited to laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Some of the above example embodiments are described as processes or methods depicted as flowcharts. Although the flowcharts describe the operations as sequential processes, many of the operations may be performed in parallel, concurrently, or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
   in a training phase:
      training a gaze prediction model including an encoder and a decoder including at least one connection from the encoder, the encoder and the decoder being configured in conjunction to predict segmentation data based on training data, the training data including images of eyes and segmentation data for an eye of the eyes including regions of the eye; and
      training a linear model together with the encoder and the decoder, the linear model being configured to predict a training characteristic using an output of the encoder based on the training data; and
   in an operational phase:
      receiving operational data including an image of a user's eye captured using a user-facing camera of a head-mounted user device; and
      only in the operational phase, predicting an operational characteristic for the user's eye without predicting segmentation data using the trained encoder and the trained linear model.

2. The method of claim 1, wherein
the training characteristic is a gaze direction.

3. The method of claim 1, wherein
the operational characteristic is a gaze direction.

4. The method of claim 1, wherein the training of the gaze prediction model includes:
   generating a first feature map based on the training data using the encoder, generating a second feature map based on the first feature map using the decoder, predicting the segmentation data based on the second feature map, generating a loss associated with the predicted segmentation data, and training at least one of the encoder and the decoder based on the loss and a loss associated with the training characteristic.

5. The method of claim 1, wherein the training of the gaze prediction model includes:

generating a first feature map based on the training data using the encoder, predicting the training characteristic based on the first feature map using the linear model, generating a loss associated with the predicted training characteristic; and training the linear model based on the loss and a loss associated with the segmentation data.

6. The method of claim 1, wherein the predicting of the operational characteristic includes:

generating a feature map based on the operational data using the encoder, and predicting the operational characteristic based on the feature map using the linear model.

7. The method of claim 1, wherein the encoder is a first convolutional neural network (CNN), and the decoder is a second CNN.

8. The method of claim 1, wherein after the training phase is complete, the method further comprising:

in the operational phase:

removing the decoder from the gaze prediction model for use in the operational phase.

9. The method of claim 1, wherein the training of the gaze prediction model includes changing at least one of parameters, features, and characteristics of features associated with at least one of the encoder, the decoder, and the linear model.

10. The method of claim 1, further comprising:

prior to the operational phase, in a calibration phase, training at least one of the encoder, the decoder, and the linear model based on user data captured using an AR user device.

11. A method comprising:

generating a first feature map based on training data including images of eyes using an encoder;

generating a second feature map based on the first feature map using a decoder including at least one skip connection from the encoder;

predicting segmentation data based on the second feature map, the segmentation data for an eye of the eyes including regions of the eye;

generating a first loss associated with the predicted segmentation data;

generating a training characteristic based on the first feature map using only a linear neural network;

generating a second loss associated with the generated training characteristic; and training at least one of the encoder, the decoder and the linear neural network based on the first loss and the second loss.

12. The method of claim 11, wherein
the training characteristic is a gaze of the eye.

13. The method of claim 11, wherein
the encoder is a first convolutional neural network (CNN), and
the decoder is a second CNN.

14. The method of claim 11, wherein after the training of the encoder, the decoder, and the linear neural network, the method further comprises removing the decoder for use in an operational phase.

15. The method of claim 11, wherein the training of at least one of the encoder, the decoder, and the linear neural network includes changing at least one of parameters, features, and characteristics of features associated with at least one of the encoder, the decoder, and the linear neural network.

16. The method of claim 11, wherein the segmentation data is a process including separating data associated with the second feature map into distinct groups.

17. The method of claim 11, wherein the predicting of the segmentation data includes a detection process and a suppression process.

18. A non-transitory computer-readable storage medium comprising instructions stored thereon that, when executed by a processor, are configured to cause a computing system to:

in an operational phase:

receive operational data including an image of a first eye; and predict an operational characteristic using:

an encoder trained based on segmentation data predicted, only in a training phase, by a decoder including at least one skip connection from the encoder, the segmentation data including regions of a second eye; and a linear neural network configured to, only in the operational phase, predict the operational characteristic without predicting the segmentation data, wherein the linear neural network is trained based on characteristics predicted based on output of the encoder.

19. The non-transitory computer-readable storage medium of claim 18, wherein:

the encoder is configured to generate a first feature map based on training data, the decoder is configured to generate a second feature map based on the first feature map, the decoder is configured to predict the segmentation data based on the second feature map, the processor is configured to generate a loss associated with the predicted segmentation data, and the processor is configured to train at least one of the encoder and the decoder based on the loss and a loss associated with a training characteristic.

20. The non-transitory computer-readable storage medium of claim 18, wherein:

the encoder is configured to generate a first feature map based on training data, the linear neural network is configured to predict a training characteristic based on the first feature map, the processor is configured to generate a loss associated with the predicted training characteristic; and the processor is configured to train the linear neural network based on the loss and a loss associated with the segmentation data.

21. The non-transitory computer-readable storage medium of claim 18, wherein
the operational characteristic is a gaze of the first eye.

* * * * *